3,418,146
PROCESS FOR PRODUCING STABILIZED
TITANIUM DIOXIDE PIGMENTS
Carl J. Rieger, Ossining, and Charles A. Quinn, Yorktown
Heights, N.Y., assignors to The Mearl Corporation,
Ossining, N.Y., a corporation of New Jersey
No Drawing. Filed Oct. 5, 1965, Ser. No. 493,224
5 Claims. (Cl. 106—300)

ABSTRACT OF THE DISCLOSURE

Process for producing titanium dixoide pigment of improved light stability and weathering characteristics, involving treatment of uncalcined hydrous titanium dioxide with a cadminum salt solution containing from 0.1 to 10% by weight cadmium, drying and calcining the thus treated material to produce a pigment product containing from 0.1 to 10% by weight cadmium.

---

This invention relates to a process for stabilizing dioxide pigments, and more particularly to such a process involving a cadmium salt treatment designed to improve the light stability and weathering characteristics of such pigments.

It is well known that unmodified or untreated titanium dioxide pigments, whether unsupported or deposited on suitable substrates, possess rather poor resistance to the effects caused by light and weathering. The poor light stability results in the well known "chalking" effect and the yellowing of films containing such pigments.

While the exact mechanism to which chalking is attributable is not yet fully understood, there is sufficient evidence to show that the presence of solar radiation, especially UV light, and moisture, are contributing factors in the degradation of organic vehicles containing titanium dioxide pigments.

A number of procedures have previously been suggested for preventing chalking and increasing light stability of titanium dioxide pigments. Heretofore known stabilizing techniques, however, either fail to improve the light stability and weather-resistance of the titanium dioxide pigments treated or, in many cases, involve the use of uneconomical and time-consuming operations not normally employed in the routine production of titanium dioxide pigments.

In U.S. Patterson Patent No. 2,138,118, for example, the blending of previously calcined titanium dioxide pigments with water-soluble cadmium compounds is said to produce an increase in light stability. In order to accomplish this, however, the patent describes re-suspending the calcined pigment in a soluble cadmium salt, forming an insoluble cadmium compound in such solution and coating the pigment by precipitation of such compound thereon, re-filtering the slurry thus produced and, finally, drying the coated pigment. It will be noted that such procedure adds several steps to the standard procedure for preparing such a titanium dioxide pigment, and is, consequently, relatively uneconomical.

It is among the objects of the present invention to provide a process for improving the light stability and weathering characteristics of titanium dioxide pigments without necessitating time-consuming and expensive extra steps in the production of such pigments.

Other objects and advantages of the invention will be apparent from a consideration of the following detailed description thereof.

Improved light stability and weathering properties are imparted to titanium dioxide pigments, in accordance with the present invention, by treating hydrous titanium dioxide, from which the titanium dioxide pigment is produced by calcination, with a solution of a cadmium salt, and thereafter drying the cadmium treated material. The resulting powder is then calcined to form a titanium dioxide pigment, containing from about 0.1 to 10%, preferably from about 0.5 to 4%, cadmium expressed as cadmium oxide, based on the weight of the $TiO_2$ present. The titanium dioxide pigment may be simple pigment or a complex one, consisting, for example, of titanium dioxide deposited on a suitable substrate, such as mica platelets. Complex pigments of this type have nacreous properties, imparting pearly luster to objects, and in addition produce colors if the titanium dioxide coating is of interference film thickness and is sufficiently uniform. Such pigments are described, for example, in copending applications Ser. No. 261,479, filed on Feb. 27, 1963 and Ser. No. 424,832, filed on Jan. 11, 1965, each of which applications is owned by the assignee of the present invention.

The stabilizing treatment of the present invention produces pigments which have about twice the light stability of titanium dioxide pigments not so treated, by the light stability testing method which will be described below. This stabilizing treatment may be utilized in any procedure involving the production of a titanium dioxide pigment by calcination of a hydrous titanium dioxide material. Such procedures are disclosed, for example, in the aforesaid copending application Ser. No. 261,479, filed on Feb. 27, 1963 and now abandoned, and Ser. No. 424,832 filed on Jan. 11, 1965 (as a continuation-in-part of application Ser. No. 348,855 filed on Mar. 2, 1964, and now abandoned), each of which is assigned to the assignee of the present invention.

The hydrous titanium dioxide materials treated in accordance with the present invention, as distinguished from the substantially anhydrous $TiO_2$ remaining after calcination, generally contain (after drying at 110° C.) from about 5% to 50%, more frequently from 5% to 20%, water on the anhydrous $TiO_2$ basis.

The cadmium treatment hereof may be effected, either by treating a filter cake or uncalcined dry powder constituted of hydrous titanium dioxide with a relatively small amount of a dilute cadmium salt solution, and subsequently drying the cadmium-treated material; or by slurrying the hydrous titanium dioxide in such a solution, filtering the slurry, and drying the resulting filter cake. While the former technique is preferable, in view of extreme simplicity, both procedures indicated fit directly into normal production schedules employed for the manufacture of titanium dioxide pigments, and, therefore, do not involve any uneconomical modifications of procedure, either prior to or after calcination, such as required in previously proposed stabilizing techniques.

The cadmium salt treatment may be effected by use of an aqueous or water-miscible, non-aqueous treating solution as desired. Non-aqueous solvents which may thus be employed include, for example, lower alkanols such as ethanol, isopropanol, etc.; ketones such as acetone, methyl ethyl ketone; and glycol ethers, such as 2-ethoxyethanol, 2-methoxyethanol. The cadmium is incorporated in the solution in the form of a salt which is soluble in the solvent thus utilized, e.g. as cadmium acetate, chloride, nitrate or sulfate, the resulting solution generally containing from about 0.1 to 10% by weight of cadmium.

In the preferred procedure referred to hereinabove, a filter cake or dry powder of the uncalcined hydrous titanium dioxide product is wet with from about ⅕ to 5 times its weight of the soluble cadmium salt solution, preferably containing from about 0.3 to 6 parts cadmium (expressed as cadmium oxide) per 100 parts of $TiO_2$ (expressed as anhydrous oxide). The resulting paste of the hydrous titanium dioxide and cadmium salt solution is thoroughly blended to insure uniform contact between the cadmium solution and the pigment material, and is thereafter dried to a powder.

In accordance with the alternative procedure specified, the hydrous titanium dioxide material is preferably slurried in the cadmium salt solution in the proportion of 100 parts $TiO_2$ (anhydrous basis) to from about 0.5 to 50, preferably from about 1 to 10 parts of cadmium (expressed as CdO). The quantity of cadmium solution and its concentration are so chosen as to yield a $TiO_2$:CdO ratio within this range and to produce a slurry which is easy to handle. The slurry is thereafter filtered, only a portion of the cadmium being retained by the hydrous $TiO_2$. The $TiO_2$-containing filter cake is then dried. The filtrate may be re-concentrated and re-used.

The dried cadmium treated material, whether prepared by either of the procedures specified above, is thereafter calcined at temperatures within the range of from about 600° to 1000° C., the higher temperatures being preferred to produce the desired titanium dioxide pigment. Accelerated light stability and weathering testing of pigments thus produced has demonstrated that such material show a marked increase in their light stability and weathering characteristics without any sacrifice in the color or hiding power of conventionally formed films or paints incorporating the same, or in the luster of those pigments formed by coating $TiO_2$ on suitable substrates, such as mica platelets.

The following examples illustrate preferred embodiments of the process of the present invention without, however, being limiting thereof.

EXAMPLE I 200 parts of a filter cake of hydrous titanium dioxide (containing approximately 60 parts of $TiO_2$ on an anhydrous basis) were mixed thoroughly in a blender with half its weight of a 2.0% solution of $Cd(NO_3)_2 \cdot 4H_2O$. The paste was mixed well so that contact was uniform, and then was dried to a powder, and was calcined at 950° C. for one hour, and milled. The resultant $TiO_2$ pigment showed superior light stability to an untreated sample, while having good color and hiding power. The cadimum content of this stabilized, calcined $TiO_2$ pigment was 0.9% CdO.

EXAMPLE II 200 parts of a dry, uncalcined powder of hydrous $TiO_2$-coated mica material (containing approximately 40 parts of $TiO_2$ on an anhydrous basis) were mixed with an equal weight of a 1.0% solution of $Cd(NO_3)_2 \cdot 4H_2O$. The resultant paste was thoroughly mixed, then dried to a powder, which was then calcined for one hour at 900° C. The resultant pigment showed a marked improvement in light stability and had good pearl luster. The cadimum content of the stabilized, calcined product was 1.2% CdO, based on the weight of the $TiO_2$ present.

EXAMPLE III

The calcined pigment from Example II was incorporated in a nitrocellulose coating lacquer formulation, as follows, using 4 parts of pigment to 96 parts of lacquer, all parts being by weight:

| | Parts |
|---|---|
| Nitrocellulose 15 to 20 seconds RS | 10 |
| Alkyd resin (glycerol-phthalic acid type) | 3 |
| Xylene | 3 |
| Ethanol | 4 |
| Butyl acetate | 80 |
| | 100 |

Metal panels were coated with the above formulation, acquiring a bright pearl luster, and then were exposed in a standard fadeometer to test for light stability. No fading was evidenced until after about 600 standard exposure hours in the fadeometer.

For comparison, a further pigment was prepared as outlined in Example II without, however, employing the cadmium nitrate treatment thereof. When such pigment was incorporated in the above nitrocellulose coating lacquer and the lacquer applied to test panels, as aforesaid, heavy fading resulted after about 250 standard exposure hours in the fadeometer.

EXAMPLE IV 1000 parts of an aqueous suspension of hydrous titanium dioxide (containing approximately 300 parts of $TiO_2$ on an anhydrous basis) were mixed with 600 parts of a 5% solution of $Cd(C_2H_3O_2)_2 \cdot 2H_2O$. The slurry was stirred for several hous, then the pigment was filtered off, dried and calcined at 850° C. for one hour. The resultant pigment gave excellent light stability, color and hiding power after incorporation in an appropriate vehicle. The cadmium content of the stabilized, calcined $TiO_2$ pigment was 1.5% CdO.

EXAMPLE V 1000 parts of an aqueous suspension containing 100 parts of a hydrous $TiO_2$-coated mica material (containing approximately 20 parts $TiO_2$ on an anhydrous basis) were mixed with 100 parts of a 4% solution of $CdCl_2$. The suspension was stirred for several hours, then the pigment was filtered, dried and calcined at 900° C. for two hours. The resultant pigment possessed increased light stability and good pearl luster. The Cd content of the stabilized product was 3.2% CdO, based on the weight of $TiO_2$ present.

EXAMPLE VI 200 parts of a dry, uncalcined powder of hydrous $TiO_2$-coated mica material, containing approximately 60 parts of $TiO_2$ (on an anhydrous basis) were mixed with 300 parts of a 0.9% solution of $CdCl_2$. The resulting paste was thoroughly mixed, was dried at 100° C., and was then calcined for two hours at 900° C. The resulting pigment contained 2.0% CdO, based on the weight of the $TiO_2$ present. The $TiO_2$-mica ratio was 35:65.

For comparison, a $TiO_2$ pigment was treated with cadmium chloride after calcination and the light stability of the respective materials tested. The control pigment was prepared by treating a calcined $TiO_2$-coated mica material (previously calcined for two hours at 900° C., as aforesaid) with cadmium chloride solution and sodium hydroxide, employing the same reagent proportions described in Example 1 of Patterson Patent No. 2,138,118. Thus, to 1140 parts of calcined $TiO_2$-coated mica containing 35% $TiO_2$ was added 1614 parts of a 1.13% solution of $CdCl_2$. 80 parts of a 10% solution of NaOH were slowly added to the stirred suspension, and stirring was continued for 30 minutes after the completion of the NaOH addition. The slurry was then filtered and dried at 110° C.

The light stability of this latter product was compared with that of the product of Example VI by the procedure of Example III. The product of Example VI showed a substantial increase in light stability, displaying no fading in a standard fadeometer test until about 500 standard exposure hours, whereas the control material showed only a small increase in light stability, fading after about 250 standard exposure hours in the fadeometer. A further control, provided by use of an unstabilized calcined $TiO_2$-coated mica material (which was not treated with a cadmium salt, either before or after calcination), faded after about 200 standard exposure hours in the fadeometer.

It will be noted that, in accordance with the procedure of the present invention, titanium dioxide pigments are produced having markedly improved light stability and weathering characteristics, as compared with titanium dioxide pigments not subjected to the treatment hereof.

It will be understood that various changes may be made in the preferred forms of the instant process for improving the light stability of titanium dioxide pigments, without departing from the scope of the present invention. Accordingly, it is intended that the preceding description be interpreted as illustrative only and not in a limiting sense.

The embodiments of the invention in which an exclusive privilege or property is claimed are defined as follows:

1. A process for producing a titanium dioxide pigment having improved light stability and weathering characteristics, which comprises forming an uncalcined hydrous titanium dioxide material, treating said material with a solution of a cadimum salt containing from 0.1 to 10% by weight cadmium, drying and calcining the cadmium treated material, the amount of cadmium salt solution being sufficient to provide a calcined titanium dioxide pigment product containing from 0.1 to 10% by weight cadmium.

2. The process as defined in claim 1, in which the uncalcined hydrous titanium dioxide is wet with from 1/5 to 5 times its weight of said solution to admix the cadmium present therein with the hydrous titanium dioxide in the proportion of from 1 to 5 parts by weight of cadmium per 100 parts of the uncalcined hydrous titanium dioxide, said process further including thoroughly blending the hydrous titanium dioxide with said solution and drying the mixture to a powder.

3. The process as defined in claim 1, in which the uncalcined hydrous titanium dioxide is slurried in said solution in the proportion of 100 parts by weight of the hydrous titanium dioxide for every 0.5 to 50 parts by weight of cadmium, and including filtering the slurry and drying the resulting filter cake to a powder.

4. The process as defined in claim 1, in which said solution is constituted of a water-soluble cadmium salt selected from the group consisting of cadmium acetate, cadmium chloride, cadmium sulfate, and cadmium nitrate.

5. The process defined in claim 1 wherein the cadmium treated material is calcined at temperatures in the range of from 600° to 1000° C.

References Cited

UNITED STATES PATENTS

| 2,138,118 | 11/1938 | Patterson | 106—300 |
| 2,232,723 | 2/1941 | Patterson | 106—300 |
| 2,296,618 | 9/1942 | Patterson | 106—308 |
| 2,304,719 | 12/1942 | Weber | 106—300 |
| 2,591,988 | 4/1952 | Willcox | 106—300 |

TOBIAS E. LEVOW, *Primary Examiner.*

SAMUEL E. MOTT, *Assistant Examiner.*

U.S. Cl. X.R.

106—308

UNITED STATES PATENT OFFICE
CERTIFICATE OF CORRECTION

Patent No. 3,418,146                    December 24, 1968

Carl J. Rieger et al.

It is certified that error appears in the above identified patent and that said Letters Patent are hereby corrected as shown below:

Column 1, line 15, "cadminum" should read -- cadmium --; line 22, before "dioxide" insert -- titanium --; lines 27 and 28, "suitable substrates, possess rather poor resistance to the dioxic pigments, whether unsupported or deposited on" should read -- dioxide pigments, whether unsupported or deposited on suitable substrates, possess rather poor resistance to the --. Column 2, line 7, after "may be" insert -- a --; line 39, "hereof" should read -- thereof --. Column 3, lines 1, 42 and 53, and column 5, lines 11 and 12, "cadimum", each occurrence, should read -- cadmium --. Column 3, line 74, "600" should read -- 500 --. Column 4, line 14, "hous" should read -- hours --.

Signed and sealed this 17th day of March 1970.

(SEAL)
Attest:

EDWARD M. FLETCHER, JR.               WILLIAM E. SCHUYLER, JR.
Attesting Officer                        Commissioner of Patents